(12) United States Patent
Oxford et al.

(10) Patent No.: US 8,948,273 B2
(45) Date of Patent: Feb. 3, 2015

(54) METHOD AND APPARATUS FOR WIRED SIGNAL TRANSMISSION

(76) Inventors: J. Craig Oxford, Nashville, TN (US); D. Michael Shields, St. Paul, MN (US)

(*) Notice: Subject to any disclaimer, the term of this patent is extended or adjusted under 35 U.S.C. 154(b) by 1242 days.

(21) Appl. No.: 11/901,702

(22) Filed: Sep. 17, 2007

(65) Prior Publication Data

US 2009/0074102 A1 Mar. 19, 2009

(51) Int. Cl.
*H04L 25/00* (2006.01)
*H04L 25/02* (2006.01)

(52) U.S. Cl.
CPC ........ *H04L 25/0264* (2013.01); *H04L 25/0266* (2013.01); *H04L 25/028* (2013.01); *H04L 25/0292* (2013.01)
USPC .......................................... 375/257; 375/358

(58) Field of Classification Search
USPC .................. 375/358, 257, 377; 725/143–144
See application file for complete search history.

(56) References Cited

U.S. PATENT DOCUMENTS

| | | | | |
|---|---|---|---|---|
| 4,773,068 A | * | 9/1988 | Korsky | 370/509 |
| 5,089,886 A | * | 2/1992 | Grandmougin | 725/143 |
| 5,107,202 A | * | 4/1992 | Renda | 324/96 |
| 5,179,577 A | * | 1/1993 | Ilyadis | 375/317 |
| 5,204,880 A | * | 4/1993 | Wurster et al. | 375/258 |
| 5,515,196 A | * | 5/1996 | Kitajima et al. | 398/185 |
| 5,966,056 A | * | 10/1999 | Thornton | 333/5 |
| 6,137,524 A | * | 10/2000 | Chea | 725/144 |
| 6,473,469 B1 | * | 10/2002 | Leitch | 375/308 |
| 6,538,865 B1 | * | 3/2003 | Nagatani et al. | 361/64 |
| 6,633,642 B1 | * | 10/2003 | Oakley | 379/405 |
| 6,654,462 B1 | * | 11/2003 | Hedberg | 379/399.01 |
| 8,546,740 B2 | * | 10/2013 | Vollenweider | 250/221 |
| 2003/0058431 A1 | * | 3/2003 | Durston | 356/73.1 |
| 2003/0142816 A1 | * | 7/2003 | Koban | 379/399.01 |
| 2004/0136519 A1 | * | 7/2004 | Lim et al. | 379/388.06 |
| 2004/0240564 A1 | * | 12/2004 | Amstutz et al. | 375/257 |
| 2006/0055379 A1 | * | 3/2006 | Yamamoto et al. | 323/212 |
| 2006/0170493 A1 | * | 8/2006 | Oldewurtel | 330/145 |
| 2007/0025492 A1 | * | 2/2007 | Canagasaby et al. | 375/377 |
| 2007/0132483 A1 | * | 6/2007 | Huang et al. | 326/86 |
| 2009/0140579 A1 | * | 6/2009 | Chang et al. | 307/126 |
| 2010/0142611 A1 | * | 6/2010 | Biman et al. | 375/233 |

* cited by examiner

*Primary Examiner* — Emmanuel Bayard
(74) *Attorney, Agent, or Firm* — Wayne Edward Ramage; Baker Donelson

(57) ABSTRACT

A method and apparatus for high quality signal transmission, which utilizes normal-mode current flow and produces an audio output signal with suppression of normal-mode voltage amplitude, comprising transmitting an audio input signal source though (1) a buffer amplifier; (2) a modulated current source; (3) a pair of wires; (4) a current transformer; and (5) a receiver amplifier for said current transformer.

13 Claims, 2 Drawing Sheets

METHOD AND APPARATUS FOR WIRED SIGNAL TRANSMISSION

BACKGROUND OF THE INVENTION

1. Field of the Invention

The present invention is a method of high quality analog or digital signal transmission by wire generally in the sub-audio to video range by means of normal-mode current flow with suppression of normal-mode voltage amplitude.

2. Description of Prior Art

The transmission of audio signals is generally in the range of 5Hz-100kHz between electronic equipment that process or otherwise employ the signal. Generally such transmission is done by originating the signal from a low impedance and receiving it at a high impedance, often referred to as "voltage matching" or "bridging". In some (usually large) systems such as telephony the source and receiving impedances are matched. This is also true in voltage based video transmission. This is seldom done anywhere else in contemporary audio practice, either consumer or professional. In all such systems the signal voltage is impressed across the dielectric (insulation) of the conductors. As a result, the properties of the dielectric may strongly affect the quality of the resulting received signal. Specifically, the attribute of dielectric absorption seems to impart an audible degradation.

Industrial control practice has for many years used another method for transmitting process signals over long distances. It is known as a current-loop. There are several variations of the technique, but the most common is known as a 4-20 mA current-loop. In this method of transmission, the signal is originated from a high impedance source and received by a low impedance receiver, essentially the opposite of voltage matching mentioned above. Generally the bandwidth of 4-20 mA loops is not high enough to support audio applications, but there is nothing inherent in the technique which precludes greater bandwidth. Industrial current-loops generally allow the reporting of a DC value and this is not necessary for audio or video, which are AC signals. This permits a different approach to current-based signal transmission.

SUMMARY OF THE INVENTION

The present invention is an apparatus for signal transmission comprising a transmitter and a receiver connected by a pair of wires. The transmitter is comprised of a non-inverting buffer amplifier, an inverting buffer amplifier and a pair of modulated current sources. The receiver is comprised of a current transformer and a receiver amplifier for the current transformer. The modulated current source can be single-ended or symmetrical with respect to the common terminal of the transmitter. The dielectric properties of the insulation of the pair of wires connecting the transmitter and receiver do not affect the transmission quality. The DC resistance of the pair of wires also does not affect the transmission quality.

The receiver is comprised of a current transformer and a receiver amplifier for said current transformer. The receiver amplifier has essentially zero input impedance.

The present invention is also a method of high quality signal transmission, which utilizes normal-mode current flow and produces an output signal with suppression of normal-mode voltage amplitude, comprising transmitting input signal source though (1) a buffer amplifier; (2) a modulated current source; (3) a pair of wires; (4) a current transformer; and (5) a receiver amplifier for said current transformer. The modulated current source is single-ended or is symmetrical with respect to the common terminal of the transmitter. The modulated current source comprises a transconductance amplifier or a voltage source, which is single-ended or is symmetrical with respect to the common terminal of the transmitter, and a sufficiently large series resistance. The dielectric properties of the insulation of the pair of wires do not affect the transmission quality. The DC resistance of the pair of wires also does not affect the transmission quality. The receiver amplifier has essentially zero input impedance.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments and structural changes may be made without departing from the scope of the invention.

In one embodiment of the present invention, the incoming signal is fed to a modulated bilateral symmetrical current-source. A description of a current-source by Thevenin's Theorem is an ideal generator of current with infinite output impedance. This means that a specified output current will flow through a connected load irrespective of the impedance of that load as long as it is finite or zero. In practice, a current source can be represented as a source of voltage behind an extremely high resistance. The upper limit of the voltage is called the compliance voltage; and the range of approximately constant-current is a function of the ratio of the range of load impedance to the Thevenin generator resistance. A modulated bilateral current-source is one, which can either sink or source current to the load in response to an input voltage. Such a circuit or device is also known as a Transconducter and the ratio of output current to input voltage is known as the transconductance (G). Thus G=Iout/Vin, the unit of G (which stands for transconductance) in the S.I. system is Siemens.

A symmetrical current-source is one in which the two terminals of the current port are identically electrically distant from the common reference, usually ground. There are numerous circuit topologies known to those skilled in the art for producing transconductance amplifiers. Any of several such circuits can be used to produce the high impedance source required by the invention. The receiver is another matter. A current-sourced signal may be accurately received in a summing amplifier at the node which is commonly known as the virtual ground. Such a circuit may be made symmetrical as well. The practical difficulty is that exposing virtual ground to the "outside world" causes stability problems is real circuit implementations. A far superior method is to regard the AC current coming from the source as a floating loop and galvanically sense the current in the loop. This is done by means of a device known as a current transformer. The advantages of this method are numerous. For example, the transformer galvanically isolates the source from the receiver. This eliminates the effects of common-mode differences in ground potentials between the equipments. Additionally, the input impedance of the receiver is essentially a short-circuit. This means that the signal voltage on the interconnecting cable is essentially zero. This eliminates the adverse influence of imperfect cable dielectrics because negligible voltage is impressed across said dielectric. Also, the symmetry of the transformer primary renders it immune to induced common mode or longitudinal currents on the interconnecting cable. Finally, the resistance of the cable has negligible influence on the results because the equivalent AC impedance of the current-source is extremely high in comparison to any possible cable resistance.

A practical current source for the purpose at hand can be comprised of a differential-output voltage amplifier followed by a reasonable value of series output resistance. The amplifier must be able to drive the output resistance as its entire load, since the receiver will look like a short circuit. If this is done, the same output configuration can be used in the conventional way, i.e. bridged by the receiver, thus allowing compatibility with ordinary receivers in audio applications. In the embodiment shown in FIG. 2, on the left side (the transmitter) consists of an inverting and a non-inverting amplifier feeding out to the twisted-pair through fixed resistors. True modulated current sources can be used, but their complexity is not necessary to the example. Also, this topology illustrates the compatibility concept with ordinary receivers.

On the right side of FIG. 2, the current transformer is typically embodied as a toroidal core with the secondary winding wound toroidally upon it and the primary consisting simply of a single conductor passing through the center of the toroid. What is important, however, is the application of the secondary winding directly to the summing nodes of the two amplifiers. This causes the secondary voltage across the transformer to be zero by the feedback action of the amplifiers. The current induced in the secondary still flows, and the resulting cancellation current in the feedback resistors of the amplifiers develops an output voltage. The two voltages are in opposite phase and are differenced by the third amplifier to produce a single-ended output. The elimination of secondary voltage on the transformer prevents magnetic core saturation which would otherwise limit the dynamic range of operation. The effective shorting of the secondary magnetizing inductance prevents its reflection to the primary which extends the time-constant of the transformer thus allowing better low-frequency response in relation to the core geometry.

Turning to FIG. 1, in the idealized arrangement the source of the signal,1, is passed through a transmitter 9, a pair of wires of arbitrary length 5, a receiver 10 to produce an output signal 8. The transmitter 9 is comprised of a non-inverting buffer amplifier 2, an inverting buffer amplifier 3, and a modulated current source 4. The receiver 10 is comprised of a current transformer 6 and a receiver amplifier for the current transformer 7.

Tuning to FIG. 2, in a preferred embodiment the source of the signal 13, is passed through a transmitter 11, a pair of wires of arbitrary length 18, a receiver 12 to produce an output signal 23. The transmitter 11 is comprised of a non-inverting buffer amplifier 14, an inverting buffer amplifier 15, and Thevenin current-source resistances 16 and 17. The receiver 12 is comprised of a current transformer 19, virtual ground amplifiers 20 and 21, a differential amplifier 22.

Figure 1:
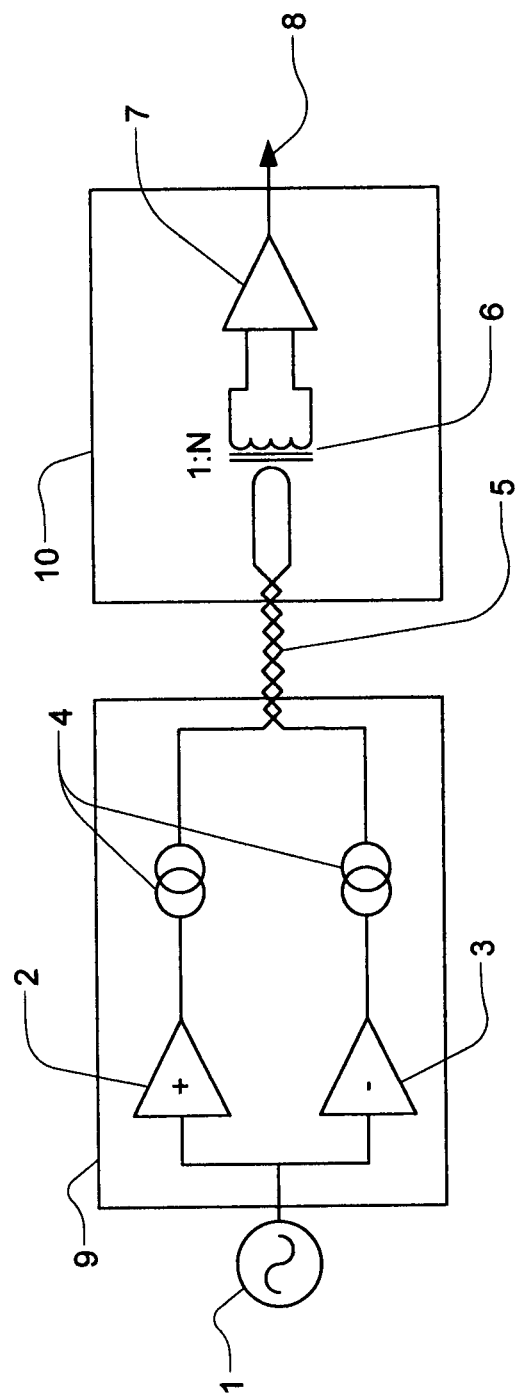
FIG. 1 shows the idealized arrangement.
Figure 2:
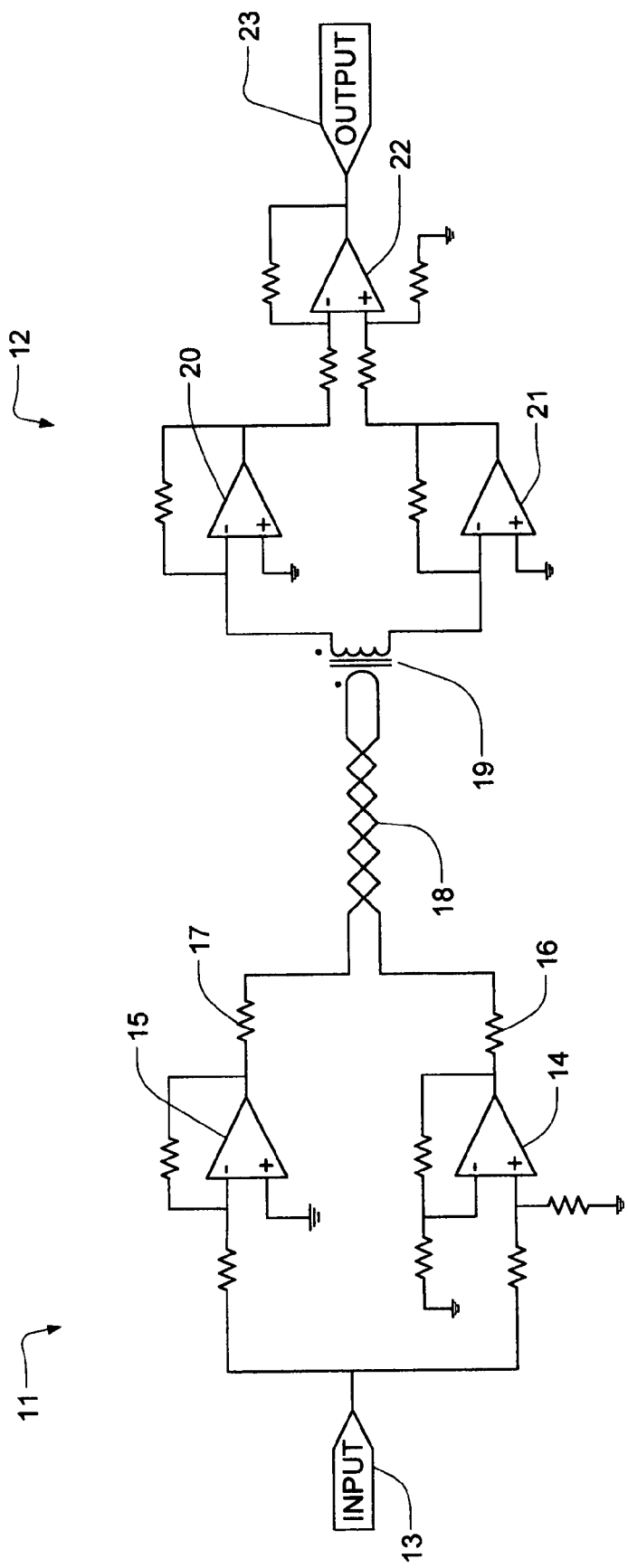
FIG. 2 shows a preferred embodiment.

What is claimed is:

1. An apparatus for high quality signal transmission, comprising:
   a single transmission unit, said unit comprising a single transmitter and a single receiver connected by a twisted pair of wires, wherein the transmitter utilizes normal-mode current flow with suppression of normal-mode voltage amplitude and produces an output signal;
   wherein said transmitter comprises a non-inverting buffer amplifier and an inverting buffer amplifier in parallel, and two modulated current sources, a first current source in line with the non-inverting buffer amplifier and the second current source in line with the inverting buffer amplifier; and
   wherein said receiver comprises a current transformer, a pair of virtual ground amplifiers in parallel, and a differential amplifier.

2. The apparatus of claim 1, wherein said modulated current source or sources are single-ended.

3. The apparatus of claim 1, wherein said modulated current source or sources are symmetrical with respect to the common terminal of said transmitter.

4. The apparatus of claim 1, wherein said modulated current source or sources further comprise a voltage source and a sufficiently large series resistance.

5. The apparatus of claim 4, wherein said voltage source is single-ended.

6. The apparatus of claim 4, wherein said voltage source is symmetrical with respect to the common terminal of said transmitter.

7. A method of high quality signal transmission, comprising the step of:
   transmitting an input signal through, in order, (1) an inverted buffer amplifier and a non-inverting buffer amplifier, in parallel; (2) a pair of modulated current sources, a first modulated current source in line with the inverted buffer amplifier and a second modulated current source in line with the non-inverting buffer amplifier; (3) a twisted pair of wires; (4) a current transformer; (5) a pair of virtual ground amplifiers, in parallel; and (6) (5) a differential amplifier;
   wherein said transmission utilizes normal-mode current flow with suppression of normal-mode voltage amplitude and produces an output signal.

8. The method of claim 7, wherein said modulated current source is single-ended.

9. The method of claim 7, wherein said modulated current source is symmetrical with respect to the transmitter common terminal.

10. The method of claim 8, wherein said modulated current source comprises a voltage source and a sufficiently large series resistance.

11. The method of claim 7, wherein said voltage source is single-ended.

12. The method of claim 7, wherein said voltage source is symmetrical with respect to the common terminal of the transmitter.

13. The method of claim 7, wherein at least one said virtual ground amplifier has essentially zero input impedance.

* * * * *